United States Patent
Ohtake

(10) Patent No.: US 7,394,960 B2
(45) Date of Patent: Jul. 1, 2008

(54) BACKLIGHT UNIT OF LIQUID-CRYSTAL DISPLAY MODULE

(75) Inventor: Seiji Ohtake, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 11/211,480

(22) Filed: Aug. 26, 2005

(65) Prior Publication Data

US 2006/0222311 A1 Oct. 5, 2006

(30) Foreign Application Priority Data

Mar. 30, 2005 (JP) ............................. 2005-098380

(51) Int. Cl.
*G02B 6/00* (2006.01)
*G02F 1/1333* (2006.01)
*G02F 1/1335* (2006.01)

(52) U.S. Cl. .................... 385/129; 385/14; 385/901; 349/58; 349/60; 349/65; 349/67

(58) Field of Classification Search ............. 349/58–60, 349/65, 67, 70, 71
See application file for complete search history.

(56) References Cited

U.S. PATENT DOCUMENTS

| | | | | |
|---|---|---|---|---|
| 5,280,372 | A * | 1/1994 | Horiuchi | 349/65 |
| 5,815,227 | A * | 9/1998 | Lee | 349/67 |
| 6,443,583 | B1 * | 9/2002 | Ha | 362/608 |
| 7,092,048 | B2 * | 8/2006 | Jeong | 349/58 |
| 2002/0093603 | A1 * | 7/2002 | Chen | 349/65 |
| 2002/0101550 | A1 * | 8/2002 | Yeh | 349/65 |

FOREIGN PATENT DOCUMENTS

| | | |
|---|---|---|
| JP | 7-261173 | 10/1995 |
| JP | 2001-66591 | 3/2001 |
| KR | 2000-37845 | 7/2000 |
| KR | 2004-5169 | 1/2004 |

OTHER PUBLICATIONS

Korean Patent Office Action, dated Oct. 31, 2006, and issued in corresponding Korean Patent Application No. 10-2005-0082997.
Chinese Patent Office Action, mailed Jul. 27, 2007 and issued in corresponding Chinese Patent Application No. 2005101030912.

* cited by examiner

*Primary Examiner*—M. R. Connelly-Cushwa
(74) *Attorney, Agent, or Firm*—Staas & Halsey LLP

(57) ABSTRACT

A backlight unit is disposed at a lower side of a liquid-crystal display module LCD, and has a case that accommodates a fluorescent tube, as a light source for light incident to the liquid-crystal display module, a lamp reflector that accommodates the fluorescent tube, and an optical waveguide having an approximately square shape in the surface that converts linear light generated by the fluorescent tube and light of the linear light reflected from the lamp reflector into planar light, and inputs the planar light to the liquid-crystal display module. The lamp reflector is made of metal, and has stoppers provided at first parts facing both ends of a side surface of the optical waveguide opposite to the fluorescent tube, at positions closer to the optical waveguide than to a second part facing the side surface of the optical waveguide excluding the first parts. With this arrangement, it is possible to provide a backlight unit of a liquid-crystal display device that can prevent the fluorescent tube from being damaged even when the optical waveguide drops due to shock or the like.

20 Claims, 7 Drawing Sheets

(A)

(B)

BACKLIGHT UNIT OF LIQUID-CRYSTAL DISPLAY MODULE

CROSS-REFERENCE TO RELATED APPLICATION

This application is based on and claims the benefit of priority from, and incorporates by reference the entire disclosure of, prior Japanese Patent Application No. 2005-098380, filed on Mar. 30, 2005.

BACKGROUND OF THE INVENTION

1. Field of the Invention

The present invention relates to a backlight unit of a liquid-crystal display module that is built into a portable personal computer such as a notebook-size personal computer (PC).

2. Description of the Related Art

In recent years, there is an increasing requirement for displaying videos and images captured with a digital camera, with high brightness, on a liquid-crystal display (LCD) module that is built in a notebook-size personal computer, or a laptop personal computer (hereinafter referred to as a laptop computer).

FIG. 1 is a perspective diagram of a simple optical waveguide backlight unit according to a conventional technique. A backlight unit 100 shown in FIG. 1 includes: an optical waveguide 101 having no prism; a fluorescent (FL) tube 102 as a light source; a lamp reflector 103 that accommodates the FL tube 102, reflects light emitted from the FL tube 102, and directs the reflected light toward the optical waveguide 101; a lamp holder 104 that accommodates the lamp reflector 103; a mold frame 105 that accommodates the optical waveguide 101 and the lamp holder 104; and an optical sheet 120 consisting of a lower diffusion sheet 106, a first prism sheet 107 of a refractive deflection type that deflects light to a normal direction of the surface of the optical waveguide 101, a second prism sheet 108, and an upper diffusion sheet 109. In the simple optical waveguide backlight unit 100 according to the conventional technique, a bulge like a plate screw is formed around a lower side of the optical waveguide 101 such that the surface area of the lower side of the optical waveguide 101 that faces the mold frame 105 via the lamp holder 104 is larger than the surface area of an upper side of the optical waveguide 101 that faces the optical sheet 120 and a liquid-crystal display (LCD) 130, in order to accommodate and fix the optical waveguide 101 within the mold frame 105 by engagement.

Further, there is an increasing requirement for a thin and light-weight mobile laptop computer. In order to meet these requirements, a prism optical waveguide backlight unit has come to be used for a light source of the LCD module.

FIG. 2 is a perspective diagram of the prism optical waveguide backlight unit according to a conventional technique. A backlight unit 200 shown in FIG. 2 includes: an optical waveguide 201 having a prism function; an FL tube 202; a lamp reflector 203; a lamp holder 204; a mold frame 205; and an optical sheet 220 consisting of a prism sheet 206, and a diffusion sheet 207. An LCD 230 is disposed at the opposite side of the optical waveguide 201 of the optical sheet 220. The prism optical waveguide backlight unit has brightness that is improved by 1.2 times of that of the simple optical waveguide backlight unit, and is made with two fewer optical sheets than the simple optical waveguide backlight unit. Therefore, the prism optical waveguide backlight unit can also contribute to a reduction in weight and size. However, because of the presence of a prism function in the optical waveguide, there is a limit to a method of fixing the optical waveguide in the prism optical waveguide backlight unit, as compared with the simple optical waveguide backlight unit.

When the prism optical waveguide backlight unit 200 employs the configuration of the simple optical waveguide backlight unit, that is, when a bulge is formed on a lower side of the optical waveguide 201, the following problem occurs. When the light emitted from the FL tube 202 accommodated in the mold frame 205 via the lamp holder 204 is sent directly to the optical waveguide 201 or is sent indirectly to the optical waveguide 201 after being reflected from the lamp reflector 203, the light emitted from the FL tube 202 is reflected diffusely from the bulge formed on the optical waveguide 201. Therefore, irregular brightness occurs in the display of the LCD module 230.

Consequently, at present, there is no other means to avoid the bulge from the optical waveguide 201 and connect the lamp holder 204 to the optical waveguide 201 using a double-faced adhesive tape, in order to fix the optical waveguide 201. According to the prism optical waveguide backlight unit 200, when the optical waveguide 201 is fixed insufficiently due to variations in manufacturing conditions of the optical waveguide 201, parts that are insufficiently fixed by the double-faced adhesive tape are easily peeled off by shock or the like, and the optical waveguide 201 can drop. There is a risk that the FL tube 202 can be broken by the dropped optical waveguide 201.

A liquid-crystal display device having a backlight described in a patent literature 1 has an object of providing a low-price liquid-crystal display device (LCD) having an optical waveguide of a uniform in-plane brightness distribution. The liquid-crystal display device has the backlight that accommodates the optical waveguide disposed on a lower surface of an LCD module and an FL tube disposed near one side surface of the optical waveguide along this side surface, within a case. The surface of the optical waveguide has an approximately square shape. At least one stopper provided in contact with one side of the optical waveguide at the FL tube side or provided near this one side prevents the optical waveguide from moving to the FL tube side. The other three sides of the optical waveguide are held by an inner wall of the case formed along the shape of the optical waveguide.

[Patent document 1] Japanese Patent Application Unexamined Publication No. 7-261173 (paragraphs [0009] to [0017] of the specification, [FIG. 1] and [FIG. 2], and the abstract)

SUMMARY OF THE INVENTION

However, according to the liquid-crystal display device having the backlight described in patent document 1, a stopper is provided on a molded case that is an integrally-formed case. The optical waveguide has a weight of a few hundred grams, and the area of the stopper that faces the optical waveguide is small. Further, because the mold case is manufactured from plastic with a plastic injection molder, the plastic stopper is weak against shock. Therefore, when the optical waveguide drops due to shock or the like and hits against the stopper, the optical waveguide damages the stopper and then jumps over the stopper and damages the fluorescent tube.

Therefore, it is an object of the present invention to provide a backlight unit of a liquid-crystal display device that can prevent a fluorescent tube from being damaged even when an optical waveguide drops due to shock or the like and when a plastic mold is used for a mold case.

In order to achieve the above object, according to one aspect of the present invention, there is provided a backlight unit of a display device, the backlight unit being disposed at a lower side of a liquid-crystal display module, and having a case that accommodates a light tube as a source of light incident on the display module, a lamp reflector that accommodates the light tube, and an optical waveguide having an approximately square shape in the surface that converts linear light generated from the light tube and light of the linear light reflected from the lamp reflector into planar light, and inputs the planar light to the display module, wherein the lamp reflector is made of metal, and has stoppers provided at first parts facing both ends of a side surface of the optical waveguide opposite to the light tube, at positions closer to the optical waveguide than to a second part facing the side surface of the optical waveguide excluding the first parts.

According to another aspect of the invention, there is provided the backlight unit of a display device according to the above aspect, wherein the lamp reflector has stoppers provided at parts that hold both ends of the light tube.

According to still another aspect of the invention, there is provided the backlight unit of a display device according to any one of the above aspects, wherein the optical waveguide is fixed to the case without using an adhesive between the optical waveguide and the case.

According to further aspect of the invention, there is provided the backlight unit of a liquid-crystal display device according to any one of the above aspects, wherein the display module is a liquid-crystal display module.

According to the present invention, it is possible to provide a backlight unit of a display device that prevents the light tube from being damaged even when the optical waveguide drops due to shock or the like.

BRIEF DESCRIPTION OF THE DRAWINGS

FIG. 7A is a cross-sectional diagram of a first part shown in FIG. 5, and FIG. 7B is a cross-sectional diagram of a second part shown in FIG. 5.

DESCRIPTION OF THE PREFERRED EMBODIMENTS

Embodiments of the present invention are explained in detail, below, with reference to the appended drawings.

Figure 1:
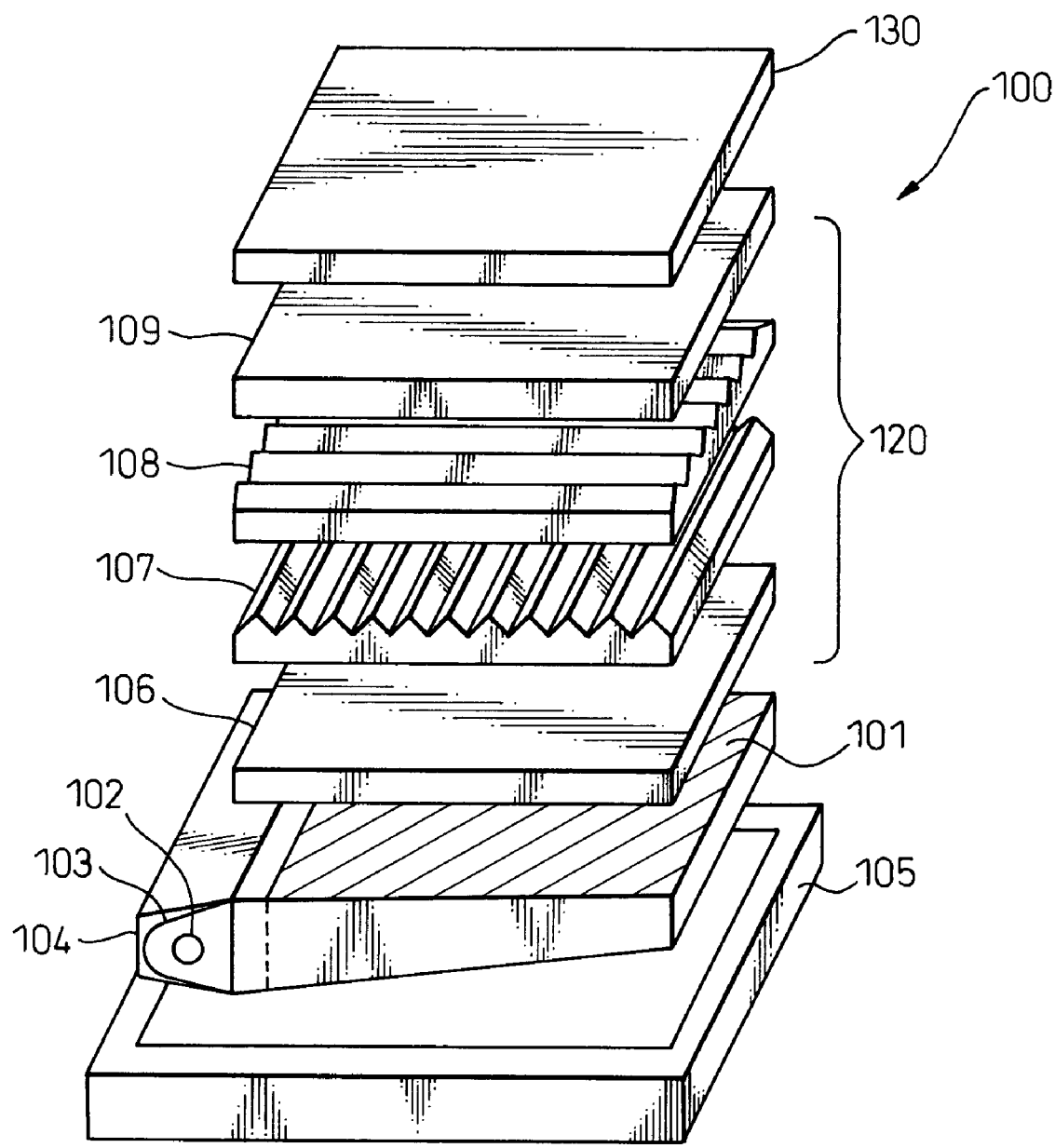
FIG. 1 is a perspective diagram of a simple optical waveguide backlight unit according to a conventional technique.
Figure 2:
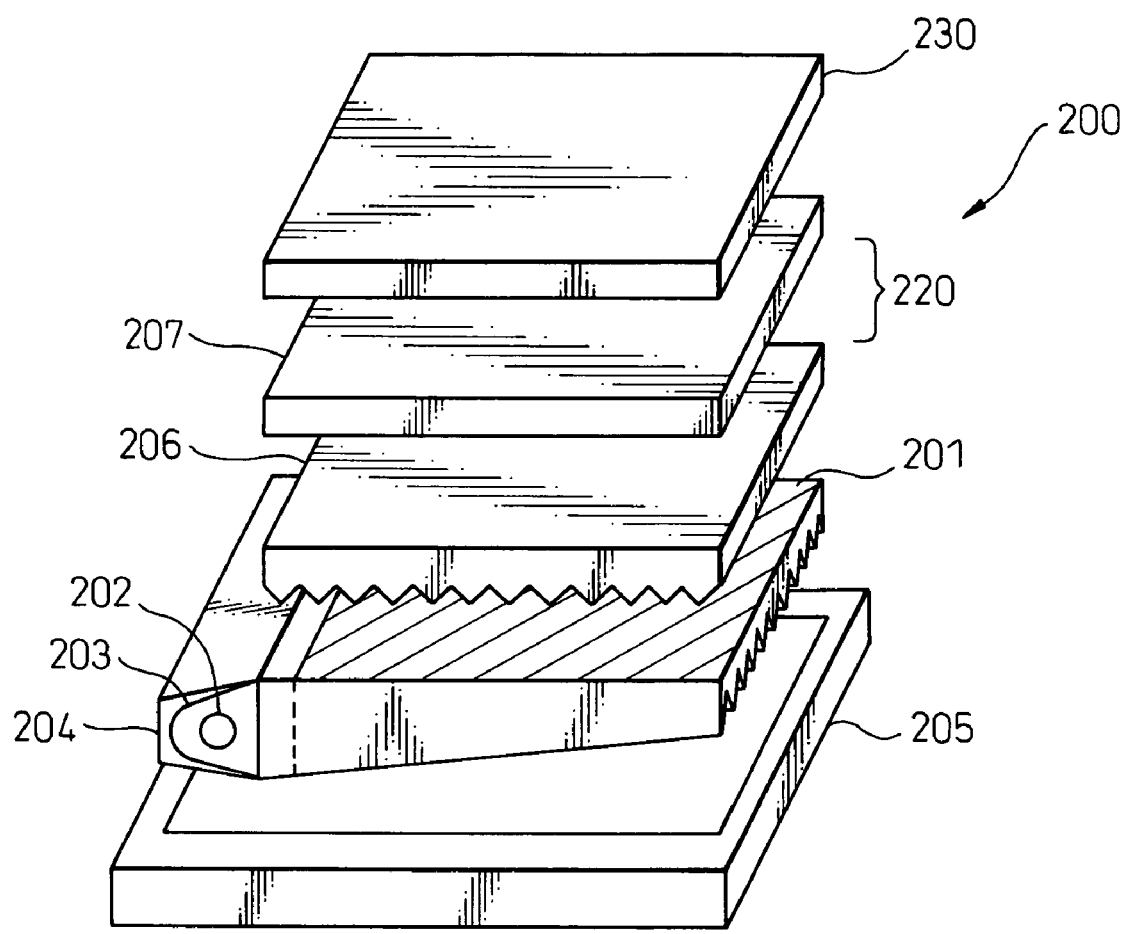
FIG. 2 is a perspective diagram of a prism optical waveguide backlight unit according to a conventional technique.
Figure 3:
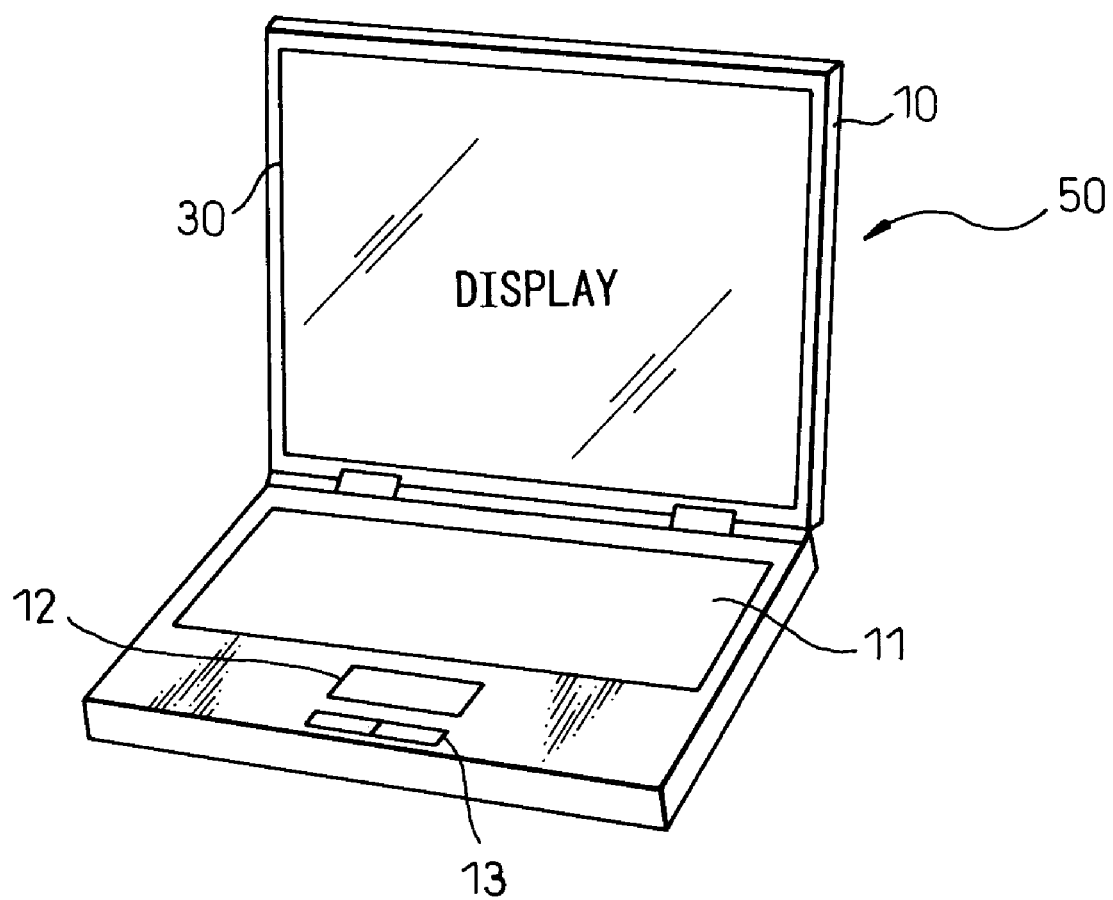
FIG. 3 is a schematic perspective diagram of a notebook-size personal computer that contains a prism optical waveguide backlight unit according to the present invention.

FIG. 3 is a perspective diagram showing the outline of a notebook-size personal computer that contains a prism optical waveguide backlight unit according to the present invention. In a personal computer (PC) main body 50 according to the present invention shown in FIG. 3, a keyboard 11, a glidepoint 12 that is disposed at the front operator side of the keyboard 11, and a button 13 that is disposed at the front operator side of the glidepoint 12 are provided as input devices. A liquid-crystal display device (LCD) 30 is provided as an output device. A printer not shown is externally connected to the PC main body 50. The glidepoint 12 is an input device that is used to move a mouse cursor that moves on the display screen of the LCD 30, and the button 13 is an input device that is used to click the mouse cursor. A backlight unit 10 is disposed at the back of the LCD 30, that is, on the surface opposite to the display surface of the LCD.

Figure 4:
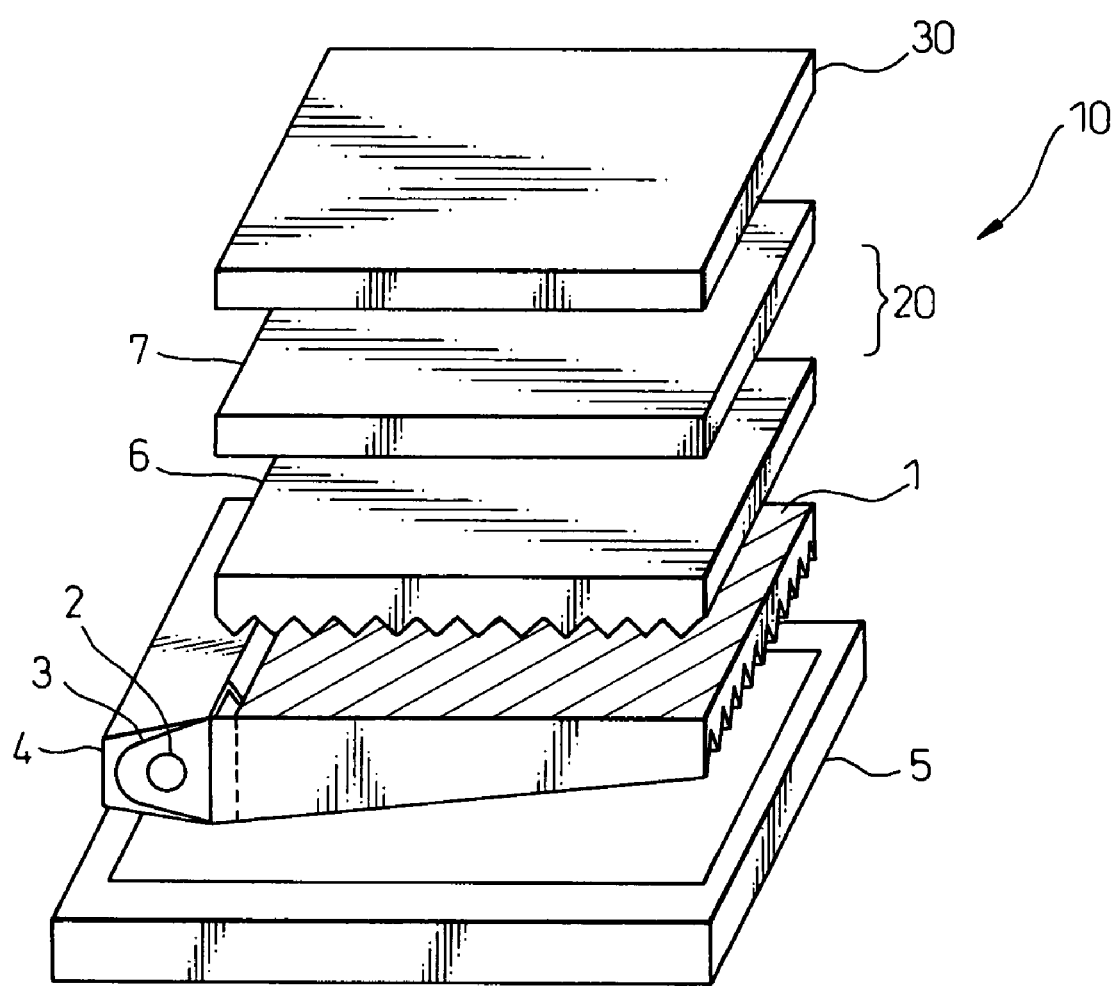
FIG. 4 is a perspective diagram of the prism optical waveguide backlight unit according to the present invention.

FIG. 4 is a perspective diagram of the prism optical waveguide backlight unit according to the present invention. The backlight unit 10 shown in FIG. 4 includes an optical waveguide 1 having a prism function, an FL tube 2, a lamp reflector 3, a lamp holder 4, a mold frame 5, and an optical sheet 20 consisting of a prism sheet 6 and a diffusion sheet 7. The FL tube 2 is a light source of linear light that is incident to the LCD 30 accommodated in the lamp reflector 3.

The optical waveguide 1 is a transparent acrylic plate having an approximately square shape at the surface that converts linear light generated from the FL tube 2 and light of the linear light reflected from the lamp reflector 3 as a light reflection plate into planar light, and inputs the planar light to the LCD 30. A line segment, cut off in a direction perpendicular to the optical sheet 30 in a cross section of the optical waveguide 1 orthogonal with the FL tube 2, becomes shorter in a direction away from the FL tube 2.

The lamp holder 4 is a case that accommodates the optical waveguide 1 and the lamp reflector 3, and is accommodated in the mold frame 5. The lamp reflector 3 and the lamp holder 4, and the lamp holder 4 and the mold frame 5 are engaged together and are fixed. Light emitted from the FL tube 2 is sent directly to the optical waveguide 1 or is sent indirectly to the optical waveguide 1 after being reflected from the lamp reflector 3 thereby irradiating the surface opposite to the display screen of the LCD 30 via the optical sheet 20.

Figure 5:
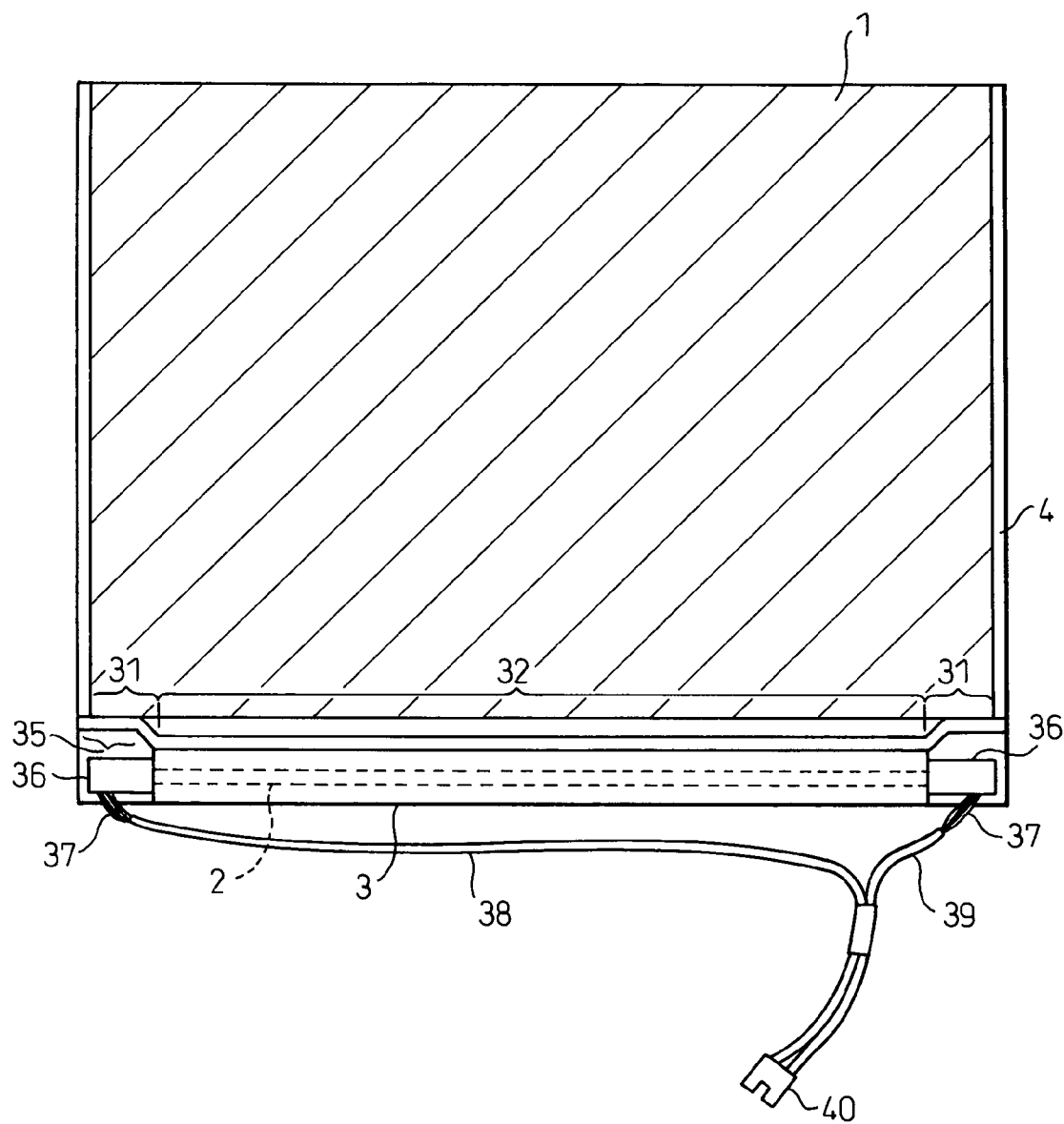
FIG. 5 is a partial top plan view of the backlight unit showing dispositions of a lamp reflector and an optical waveguide shown in FIG. 4.
Figure 6:
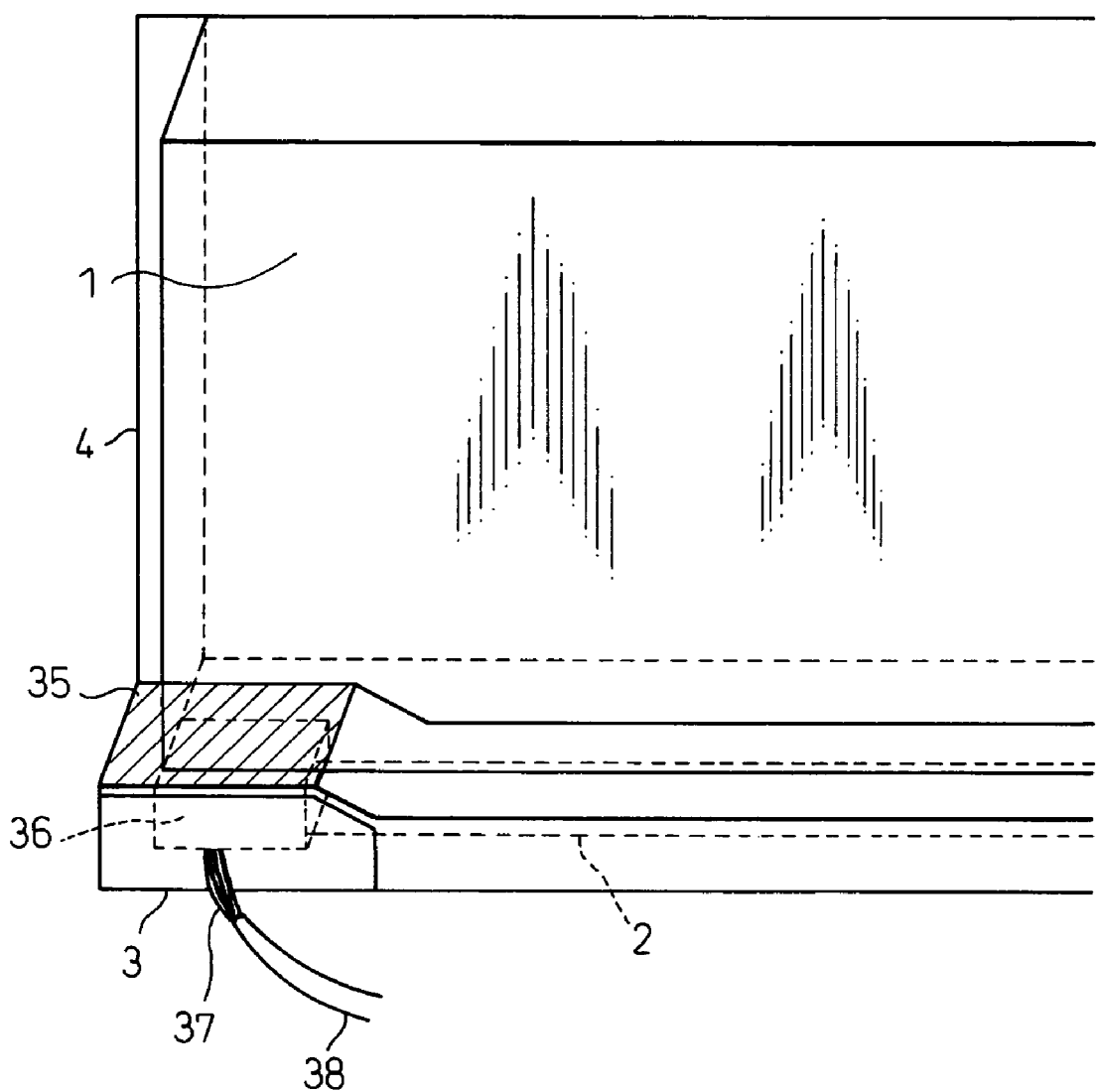
FIG. 6 is an enlarged perspective diagram of one end of the lamp reflector shown in FIG. 5.
Figure 7:
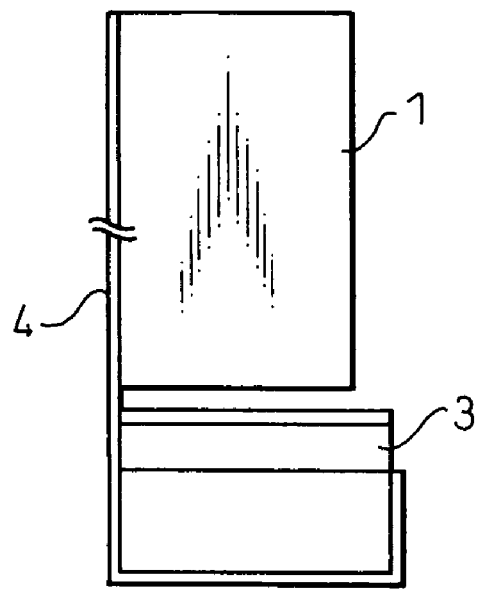
FIG. 7A and FIG. 7B are cross-sectional diagrams of the lamp reflector cut in a direction approximately perpendicular to an axial direction of the optical waveguide, where
Figure 7:
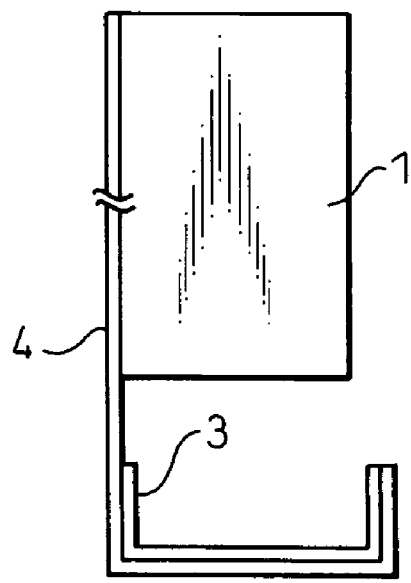

FIG. 5 is a partial top plan view of the backlight unit 10 showing dispositions of the lamp reflector 3 and the optical waveguide 1 shown in FIG. 4. FIG. 6 is an enlarged perspective diagram of one end of the lamp reflector 3 shown in FIG. 5. FIG. 7A and FIG. 7B are cross-sectional diagrams of the lamp reflector 3 cut in a direction approximately perpendicular to an axial direction of the optical waveguide 1, where FIG. 7A is a cross-sectional diagram of a first part 31 shown in FIG. 5, and FIG. 7B is a cross-sectional diagram of a second part 32 shown in FIG. 5.

As shown in FIGS. 5, 6, 7A, and 7B, the optical waveguide 1 and the lamp reflector 3 are accommodated in the mold frame 5 of the backlight unit 10 via the lamp holder 4, with the FL tube 2 accommodated in the lamp reflector 3. The lamp reflector 3 is made of metal, and has stoppers 35 (a shaded part in FIG. 6) provided at the first parts 31 facing respective, opposite ends of a side surface of the optical waveguide 1 opposite to the FL tube 2, at positions closer to the optical waveguide 1 than to the second part 32 facing the side surface of the optical waveguide 1 excluding the first parts 31. In the case of the lamp reflector according to the conventional technique, a cross section of the first parts and the second part of the lamp reflector has a continuous U shape. However, in the case of the lamp reflector 3 according to the embodiment of the present invention, a cross section of the second part 32 has a U shape, but the stoppers 35 are provided at the first parts 31. Therefore, the stoppers 35 prevent the optical waveguide 1 from being dropped onto the FL tube 2 due to shock or the like.

The lamp reflector 3 has the stoppers 35 provided at the parts that respective, opposite ends of the FL tube 2. The FL tube 2 is fixed with rubber holders 36 that are fitted to the opposite ends of the FL tube 2 within the lamp reflector 3. One end of a low-voltage cable 38 covered with a rubber bushing 37 is connected to one end of the rubber holder 36. One end of a high-voltage cable 39 covered with the rubber bushing 37 is connected to the other rubber holder 36 at the other end of the FL tube 2. The other ends of the low-voltage cable 38 and the high-voltage cable 39 respectively are connected to a connector 40 that is connected to the power source of the FL tube 2.

When the optical waveguide 1 is accommodated on the inner wall of the mold frame 5 with a slight gap via the lamp holder 4 as a case, the stoppers 35 can prevent the optical waveguide 1 from being dropped to the FL tube 2 due to shock or the like. Therefore, in this case, the optical waveguide 1 can be fixed without using an adhesive between the optical waveguide 1 and the lamp holder 4 accommodated in the mold frame 5.

What is claimed is:

1. A backlight unit of a display module, the backlight unit being disposed at a lower side of a liquid-crystal display module and having a case that accommodates a light tube as a source of light incident on the display module, a lamp reflector that accommodates the light tube, and an optical waveguide having an approximately square shape in the surface that converts linear light generated from the light tube and light of the linear light reflected from the lamp reflector into planar light, and inputs the planar light to the display module, wherein
the lamp reflector is made of metal, and has stoppers provided at first parts facing respective ends of a side surface of the optical waveguide opposite to the light tube, oriented in a direction parallel to a longitudinal direction of the light tube and at positions closer to the optical waveguide than to a second part, extending between the first parts and facing the side surface of the optical waveguide, excluding the first parts.

2. The backlight unit according to claim 1, wherein the lamp reflector stoppers hold the respective, opposite ends of the light tube.

3. The backlight unit according to claim 2, wherein the optical waveguide is fixed to the case without using an adhesive between the optical waveguide and the case.

4. The backlight unit according to claim 1, wherein the optical waveguide is fixed to the case without using an adhesive between the optical waveguide and the case.

5. The backlight unit according to claim 1, wherein the display module is a liquid-crystal display module.

6. A display module, comprising:
a backlight unit disposed at a lower side of a liquid-crystal display module and having a case that accommodates a light tube as a source of light incident on the display module;
a lamp reflector that accommodates the light tube;
an optical waveguide having an approximately square shape in a surface that converts linear light generated by the light tube and light of the linear light reflected from the lamp reflector into planar light, and inputs the planar light to the display module; and
the lamp reflector being made of metal and having stoppers provided at first parts facing respective ends of a side surface of the optical waveguide opposite to the light tube, oriented in a direction parallel to a longitudinal direction of the light tube and at positions closer to the optical waveguide than to a second part, extending between the first parts and facing a side surface of the optical waveguide, excluding the first parts.

7. The display module according to claim 6, wherein the lamp reflector has the stoppers hold the respective ends of the light tube.

8. The display module according to claim 7, wherein the optical waveguide is fixed to the case without using an adhesive between the optical waveguide and the case.

9. The display module according to claim 6, wherein the optical waveguide is fixed to the case without using an adhesive between the optical waveguide and the case.

10. The display module according to claim 6, wherein the display module is a liquid-crystal display module.

11. An apparatus with a built-in display module, the module comprising:
a backlight unit disposed at a lower side of a liquid-crystal display module and having a case that accommodates a light tube as a source of light incident on the display module;
a lamp reflector that accommodates the light tube,
an optical waveguide having an approximately square shape in a surface that converts linear light generated by the light tube and light of the linear light reflected from the lamp reflector into planar light, and inputs the planar light to the display module; and
the lamp reflector being made of metal and having stoppers provided at first parts facing respective ends of a side surface of the optical waveguide opposite to the light tube, oriented in a direction parallel to a longitudinal direction of the light tube and at positions closer to the optical waveguide than to a second part facing a side surface of the optical waveguide, excluding the first parts.

12. The apparatus according to claim 11, wherein the lamp reflector stoppers hold the respective ends of the light tube.

13. The apparatus according to claim 12, wherein the optical waveguide is fixed to the case without using an adhesive between the optical waveguide and the case.

14. The apparatus according to claim 11, wherein the optical waveguide is fixed to the case without using an adhesive between the optical waveguide and the case.

15. The apparatus according to claim 11, wherein the display module is a liquid-crystal display module.

16. An information processing apparatus with a built-in apparatus having a built-in display module, the module comprising:
a backlight unit disposed at a lower side of a liquid-crystal display module and having a case that accommodates a light tube as a source of light incident on the display module;
a lamp reflector that accommodates the light tube, and
an optical waveguide having an approximately square shape in a surface that converts linear light generated by the light tube and light of the linear light reflected from the lamp reflector into planar light, and inputs the planar light to the display module; and
the lamp reflector being made of metal and having stoppers provided at first parts facing opposite ends of a side surface of the optical waveguide opposite to the light tube, oriented in a direct parallel to a longitudinal direction of the light tube and at positions closer to the optical waveguide than to a second part facing a side surface of the optical waveguide, excluding the first parts.

17. The information processing apparatus according to claim 16, wherein the lamp reflector stoppers hold the respective ends of the light tube.

18. The information processing apparatus according to claim 17, wherein the optical waveguide is fixed to the case without using an adhesive between the optical waveguide and the case.

19. The information processing apparatus according to claim 16, wherein the optical waveguide is fixed to the case without using an adhesive between the optical waveguide and the case.

20. The information processing apparatus according to claim 16, wherein the display module is a liquid-crystal display module.

* * * * *